United States Patent [19]

Desjardins

[11] Patent Number: 4,572,039

[45] Date of Patent: Feb. 25, 1986

[54] INTERLOCKING LOCK SCREW WITH SCREW DRIVER

[76] Inventor: Warren Desjardins, 128 Engelke St., Patchogue, N.Y. 11772

[21] Appl. No.: 615,470

[22] Filed: May 30, 1984

[51] Int. Cl.⁴ ............................................. B25B 15/00
[52] U.S. Cl. ..................................... 81/451; 411/140;
411/373; 411/407
[58] Field of Search .............. 411/403, 402, 404, 405,
411/406, 407, 408, 410, 910, 140, 216, 221, 321,
371, 372, 373; 81/451, 456, 460, 461

[56] References Cited

U.S. PATENT DOCUMENTS

| 7,124 | 5/1876 | Nunn | 411/373 |
|---|---|---|---|
| 1,184,173 | 5/1916 | Gehring | 411/140 |
| 1,296,165 | 3/1919 | Costuma | 411/910 X |
| 1,548,297 | 8/1925 | Wintrob | 411/140 |
| 1,677,607 | 7/1928 | Wood | 411/910 X |
| 1,797,390 | 3/1931 | Wood | 411/403 X |
| 1,997,422 | 4/1935 | Lorenzen | 411/403 |
| 3,695,321 | 10/1972 | Garehime | 81/461 X |
| 4,130,152 | 12/1978 | Bolen | 81/451 |
| 4,339,971 | 7/1982 | Zatorre | 81/436 |

FOREIGN PATENT DOCUMENTS

| 515611 | 8/1955 | Canada | 411/402 |
|---|---|---|---|
| 170336 | 5/1906 | Fed. Rep. of Germany | 411/373 |
| 14573 | of 1912 | United Kingdom | 411/373 |
| 18503 | of 1913 | United Kingdom | 411/373 |

*Primary Examiner*—Kenneth J. Dorner
*Assistant Examiner*—Adrian H. Whitcomb, Jr.
*Attorney, Agent, or Firm*—Richard L. Miller

[57] ABSTRACT

An interlocking lock screw and screwdriver which prevents the specially designed screwdriver blade with guide dimples from slipping out of a specially designed screw head with a screwdriver guide channel and guide dimple entry apertures. The screwdriver may be used in any position including sideways and directly overhead. A rotational locking system is provided which allows a user to drive a staple or brad through the screw head locking it in place or a decorative locking cap may be used. A decorative non-locking cap is also provided which is easy to install yet easily stays in place.

8 Claims, 6 Drawing Figures

INTERLOCKING LOCK SCREW WITH SCREW DRIVER

BACKGROUND OF THE INVENTION

The present invention relates generally to the field of fastener devices and, more specifically to improved screws and mating screwdrivers.

At the present state of the art a number of fastener type screws are available with an assortment of screw head configurations including slotted heads, Phillips heads and Allen heads. All suffer from one major shortcoming; that is, the tip of the screw driver is likely to slip out of the screw head. This wastes time and energy and may result in physical injury to the user when the screwdriver tip slips off a screw head and punctures the flesh of the user. Also, injury may particularly result if the screwdriver slips off an electrically active screw. State of the art screws are difficult to use in any position other than that in which force is applied in a downward direction otherwise a lateral component of the applied force is likely to cause the screwdriver to slip. Current fasteners also rely upon thread friction to lock the screw from turning after it has been installed. It is also quite difficult to decoratively cap existing fasteners.

SUMMARY OF THE INVENTION

It is therefore a primary object of the present invention to provide an interlocking lock screw and screw driver in which the screwdriver blade locks to the screw head.

A further object is to provide an interlocking lock screw and screwdriver which prevents the screwdriver tip from slipping off the screw head.

A further object is to provide an interlocking lock screw and screwdriver which can easily be operated in any position including sideways and directly overhead.

A yet further object is to provide an interlocking lock screw and screwdriver which is simple and inexpensive to manufacture and may be made with various threads including machine threads, sheet metal threads and wood screw threads.

A still further object is to provide an interlocking lock screw and screwdriver which can be locked rotationally into place using a pointed locking device such as a staple, nail, smaller screw, or brad.

A yet still further object is to provide an interlocking lock screw and screwdriver to which a decorative cap can be easily yet securely installed.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
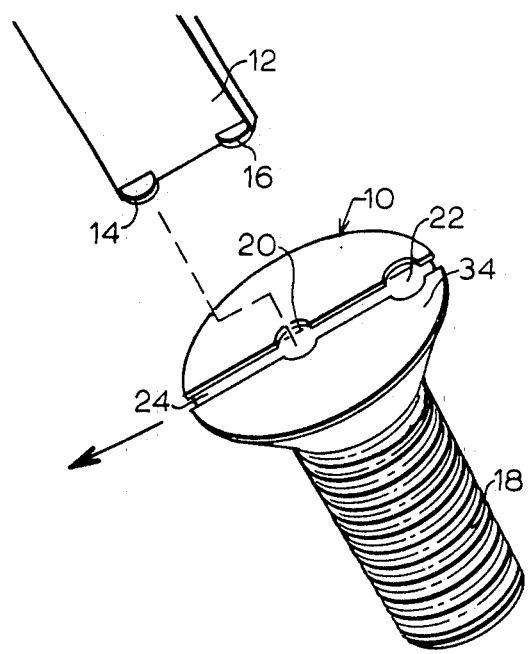
FIG. 1 is a perspective view of the invention.
Figure 2:
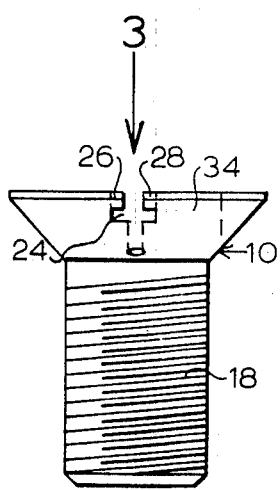
FIG. 2 is a side elevational view of the screw portion of the invention with the screw slot perpendicular to the paper.
Figure 3:
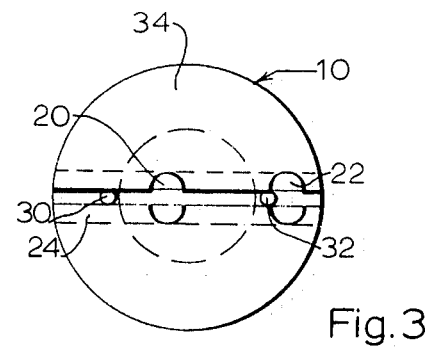
FIG. 3 is a plan view of the screw portion of the invention taken along the direction of arrow 3 in FIG. 2.

The basic concepts of the invention's 10 operation may best be understood with reference to FIGS. 1, 2 and 3. A tapered screwdriver blade 12 is provided with two pairs of projecting guide dimples 14 and 16 which project out perpendicular to the axis of the screw driver blade 12. The screw 10 has a threaded shank 18 which is shown as a machine thread for illustrative purposes, although any type of thread may be used. Guide dimple pairs 14 and 16 are inserted into guide dimple entry apertures 20 and 22 respectively in screw head 34 and thereby enter screwdriver channel 24. The tapered screwdriver blade 12 is locked to screw 10 by sliding the blade 12 to the left as indicated by the arrow in FIG. 1. FIG. 2 illustrates the overhanging ledges 26 and 28 which capture the projecting guide dimples pairs 14 and 16 and lock blade 12 into place.

Figure 4:
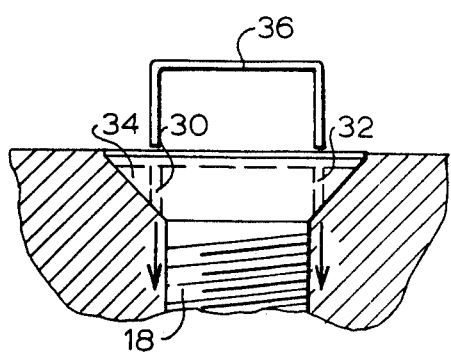
FIG. 4 is a side elevational view of the screw portion of the invention shown embedded in a clear material, with the screw drive slot parallel to the paper, showing a typical locking mechanism.
Figure 6:
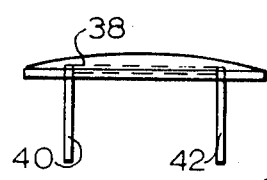
FIG. 6 is a side view of another embodiment of a combination of decorative cap and screw locking device.

A separate mechanism for rotationally locking the screw 10 into place may best be understood with reference to FIGS. 3 and 4. Two locking device apertures 30 and 32 extend from the bottom of screwdriver channel 24 through the bottom of screw head 34. In FIG. 4 a locking staple 36 is shown about to be inserted through locking device apertures 30 and 32 in the direction of the arrows. Any sharp pointed device such as a brad, nail, or even a small screw could also be used. As shown in FIG. 6 a decorative cap 38 with locking pins 40 and 42 could also be used.

Figure 5:
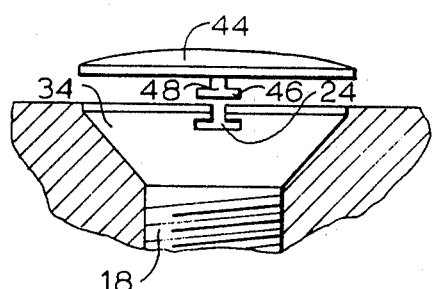
FIG. 5 is a side elevational view of the screw portion of the invention shown embedded in a clear material, with the screw drive slot perpendicular to the paper, illustrating how a decorative cap is secured.

If decoration without locking is desired, a decorative cap 44 with mating locking dimples 46, such as that illustrated in FIG. 5 may be used. In this case cap 44 has a projection 48 which is similar to screw driver blade 12 so that after the cap is alined over the screw with the dimples in apertures 20, and 22 it is slid sideward so that the dimples are captured by ledges 26, and 28 thereby holding the cap in place over the screw head.

If desired a small amount of adhesive material may be used to prevent the cap from inadvertently being slid back to the removal position.

While the particular drawings illustrate a conventional flat head screw it should be observed that the instant invention could be embodied in any number of various type of screw head.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An interlocking screw and screwdriver, comprising in combination:
   (a) an elongated screwdriver with a tapered blade, a pair of spaced apart guide dimples each lying in a plane perpendicular to the elongated dimension of the blade and each projecting laterally from opposing sides of the blade at the distal edge thereof; and
   (b) a screw with a threaded shank and a screwhead having a top surface including a transverse slot in the top surface for receiving the screwdriver blade and being narrower than the width of said guide dimples, a channel of sufficient width and height to slidably receive said pair of guide dimples and formed into said screwhead beneath said slot, said slot being narrower than said channel and forming an entry into said channel, a pair of spaced apart guide dimple entry apertures matingly shaped to axially receive said pair of guide dimples and formed into said top surface along said slot and continuing to said channel, whereby the screwdriver blade can be axially inserted into the slot with the guide dimples axially entering the guide dimple entry apertures and is locked in place by moving the blade transversely with respect to the screw to retain said guide dimples in said channel.

2. An interlocking screw and screwdriver, as recited in claim 1, wherein said threaded shank is a machine screw thread.

3. An interlocking screw and screwdriver, as recited in claim 1, wherein said threaded shank is a sheet metal screw thread.

4. An interlocking screw and screwdriver, as recited in claim 1, wherein said threaded shank is a wood screw thread.

5. An interlocking screw and screwdriver, as recited in claim 1, wherein said screwhead comprises at least one locking device aperture which passes from the bottom of said channel and extends through the bottom of said screwhead wherein a pointed locking device may be inserted through said locking device aperture, thereby preventing any rotation of said screw.

6. A screw, as recited in claim 5, wherein said pointed locking device is a staple.

7. A screw, as recited in claim 5, wherein said pointed locking device is a decorative cap with locking pins.

8. An interlocking screw and screwdriver, as recited in claim 1, further comprising a decorative cap with guide dimples which may be installed onto said screw by inserting said guide dimples into said guide dimple entry apertures in said screwdriver channel and sliding said decorative cap laterally.

* * * * *